United States Patent
Yoo et al.

(10) Patent No.: US 10,468,685 B2
(45) Date of Patent: Nov. 5, 2019

(54) CARBON NANOTUBE DISPERSION AND METHOD FOR PRODUCING SAME

(71) Applicant: LG CHEM, LTD., Seoul (KR)

(72) Inventors: Houngsik Yoo, Daejeon (KR); Jongheon Seol, Daejeon (KR); Jong Won Lee, Daejeon (KR); Dong Hyun Kim, Daejeon (KR); Gyemin Kwon, Daejeon (KR); Yelin Kim, Daejeon (KR); Jungkeun Yoo, Daejeon (KR); Dong Hyun Cho, Daejeon (KR); Sang Hoon Choy, Daejeon (KR); Hyeon Choi, Daejeon (KR); Kyungyeon Kang, Daejeon (KR); Jihee Woo, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 15/762,938

(22) PCT Filed: Jul. 27, 2016

(86) PCT No.: PCT/KR2016/008244
§ 371 (c)(1),
(2) Date: Mar. 23, 2018

(87) PCT Pub. No.: WO2017/052064
PCT Pub. Date: Mar. 30, 2017

(65) Prior Publication Data
US 2018/0269485 A1    Sep. 20, 2018

(30) Foreign Application Priority Data

Sep. 25, 2015  (KR) .................. 10-2015-0137107

(51) Int. Cl.
| | | |
|---|---|---|
| *H01B 1/18* | (2006.01) | |
| *H01M 4/62* | (2006.01) | |
| *H01M 10/0525* | (2010.01) | |
| *C01B 32/174* | (2017.01) | |
| *H01M 4/139* | (2010.01) | |
| *B82Y 30/00* | (2011.01) | |
| *B82Y 40/00* | (2011.01) | |

(52) U.S. Cl.
CPC .......... *H01M 4/625* (2013.01); *C01B 32/174* (2017.08); *H01B 1/18* (2013.01); *H01M 4/139* (2013.01); *H01M 4/622* (2013.01); *H01M 10/0525* (2013.01); *B82Y 30/00* (2013.01); *B82Y 40/00* (2013.01); *C01B 2202/32* (2013.01); *C01B 2202/36* (2013.01); *Y10S 977/742* (2013.01); *Y10S 977/753* (2013.01); *Y10S 977/842* (2013.01); *Y10S 977/948* (2013.01)

(58) Field of Classification Search
CPC .. H01M 10/0525; H01M 4/139; H01M 4/622; H01M 4/625; Y10S 977/742; Y10S 977/753; Y10S 977/842; Y10S 977/948; B82Y 30/00; B82Y 40/00; C01B 2202/32; C01B 2202/36; C01B 32/174; H01B 1/18
See application file for complete search history.

(56) References Cited

U.S. PATENT DOCUMENTS

| | | | |
|---|---|---|---|
| 2010/0330358 A1* | 12/2010 | Hashimoto | B82Y 30/00 428/323 |
| 2012/0058889 A1* | 3/2012 | Nishino | B01J 21/10 502/328 |
| 2014/0183417 A1 | 7/2014 | Kim et al. | |
| 2015/0274529 A1 | 10/2015 | Kim et al. | |

FOREIGN PATENT DOCUMENTS

| | | |
|---|---|---|
| JP | 2005-75661 A | 3/2005 |
| JP | 2014-107191 A | 6/2014 |
| JP | 2014-181140 A | 9/2014 |
| KR | 10-2013-0059936 A | 6/2013 |
| KR | 10-1294596 B1 | 8/2013 |
| WO | WO 2009/098779 A1 | 8/2009 |
| WO | WO 2015/047042 A1 | 4/2015 |

OTHER PUBLICATIONS

International Search Report (PCT/ISA/210) issued in PCT/KR2016/008244, dated Oct. 27, 2016.
Extended European Search Report dated Aug. 2, 2018 for Application No. 16848790.8.

* cited by examiner

*Primary Examiner* — Mark Kopec
*Assistant Examiner* — Jaison P Thomas
(74) *Attorney, Agent, or Firm* — Birch Stewart Kolasch & Birch LLP

(57) ABSTRACT

The present disclosure relates to a carbon nanotube dispersion liquid comprising bundle-type carbon nanotubes; a dispersion medium; and a polyvinyl butyral resin having a weight average molecular weight of greater than 50,000, a method for preparing the same, methods for preparing electrode slurry and an electrode using the same, and an electrode and a secondary battery prepared using the carbon nanotube dispersion liquid.

12 Claims, No Drawings

CARBON NANOTUBE DISPERSION AND METHOD FOR PRODUCING SAME

TECHNICAL FIELD

The present specification claims priority to and the benefits of Korean Patent Application No. 10-2015-0137107, filed with the Korean Intellectual Property Office on Sep. 25, 2015, the entire contents of which are incorporated herein by reference.

The present disclosure relates to a carbon nanotube dispersion liquid in which carbon nanotubes are uniformly dispersed into a dispersion medium, a method for preparing the same, methods for preparing electrode slurry and an electrode using the carbon nanotube dispersion liquid, an electrode prepared using the same, and a battery comprising the same.

BACKGROUND ART

Micro carbon materials such as carbon black, ketjen black, fullerene, graphene and carbon nanotubes have been widely used in fields such as electronics and energy fields due to their electrical properties and thermal conductivity. Particularly, carbon nanotubes, one type of micro carbon fibers, are tube-type carbon having a thickness of 1 µm diameter or less, and are expected to be used and commercialized in various fields due to their high conductivity, tensile strength and thermal resistance caused from their unique structures.

However, despite such usefulness of carbon nanotubes, carbon nanotubes have limits in the use due to low solubility and dispersibility. In other words, carbon nanotubes have a problem in that they do not form a stably dispersed state and cause aggregation in an aqueous solution due to strong Van der Waals interaction between them.

In view of such a problem, various attempts have been made. Specifically, methods of dispersing carbon nanotubes into a dispersion medium through mechanical dispersion treatment such as ultrasonic treatment have been proposed. However, these methods have a problem in that, although dispersibility is excellent while irradiating ultrasonic waves, carbon nanotubes start to aggregate when ultrasonic irradiation is finished and aggregate when the carbon nanotube concentration increases.

In addition, methods of dispersing and stabilizing carbon nanotubes using various dispersants have been proposed. For example, methods of dispersing carbon nanotubes through ultrasonic treatment in water or N-methyl-2-pyrrolidone (hereinafter, NMP) using an anionic surfactant such as sodium dodecyl sulfonate or sodium dodecyl benzenesulfonate, or a nonionic surfactant such as Triton (registered trademark)-X-100 have been proposed. In addition, methods of dispersing carbon nanotubes into a dispersion medium such as water or NMP using a polymer-based dispersant such as polyvinyl pyrrolidone (hereinafter, EVP) or a cellulose derivative, a water-soluble polymer, instead of a surfactant have been proposed. However, these methods also have a problem in that handling becomes difficult when micro carbon fibers are dispersed into a dispersion medium in a high concentration due to an increase in the viscosity.

Accordingly, in order to expand carbon nanotube applications, preparing a dispersion liquid in which carbon nanotubes are uniformly dispersed into a dispersion medium is important.

DISCLOSURE

Technical Problem

One embodiment of the present application is directed to providing a carbon nanotube dispersion liquid having enhanced dispersibility. Other embodiments of the present specification are directed to providing a method for preparing the carbon nanotube dispersion liquid, methods for preparing electrode slurry and an electrode using the carbon nanotube dispersion liquid, an electrode prepared using the method, and a battery comprising the same.

Technical Solution

One embodiment of the present application provides a carbon nanotube dispersion liquid comprising bundle-type carbon nanotubes, a dispersion medium, and a polyvinyl butyral resin having a weight average molecular weight of greater than 50,000, wherein dispersed particle diameters of the bundle-type carbon nanotubes have particle size distribution $D_{50}$ of 3 µm to 10 µm.

According to another embodiment of the present application, the polyvinyl butyral resin has a weight average molecular weight of 150,000 or greater.

According to another embodiment of the present application, a hydroxyl group-containing repeating unit content of the polyvinyl butyral resin is 15% by weight or greater.

According to another embodiment of the present application, the carbon nanotube dispersion liquid comprises a first polyvinyl butyral resin having a weight average molecular weight of greater than 50,000; and a second polyvinyl butyral resin having a lower weight average molecular weight than the first polyvinyl butyral resin. Herein, the second polyvinyl butyral resin may have a weight average molecular weight of greater than 50,000 as long as having a weight average molecular weight lower than the first polyvinyl butyral resin, however, the weight average molecular weight may also be 50,000 or less.

According to another embodiment of the present application, the carbon nanotube dispersion liquid comprises a carbon nanotube complex in which the polyvinyl butyral resin is introduced to a surface of the bundle-type carbon nanotubes.

According to another embodiment of the present application, the dispersed particle diameters of the bundle-type carbon nanotubes have particle size distribution such that $D_{50}$ is from 3 µm to 10 µm, for example, 5 µm to 7 µm, $D_{10}$ is 1 µm or greater, and $D_{90}$ is 30 µm or less, for example, 20 µm or less. For example, the dispersed particle diameters of the bundle-type carbon nanotubes have particle size distribution $D_{10}$ of 1 µm to 3 µm. According to a specific example, $D_{50}$ of 6 µm and $D_{50}$ of 20 µm or less may be employed as target values. Herein, particle size distribution $D_{50}$ may be defined as a particle size at a 50% base in the particle size distribution. In addition, the dispersed particle diameters of the bundle-type carbon nanotubes may be measured using, for example, a laser diffraction method. More specifically, the dispersion in which the bundle-type carbon nanotubes are dispersed is introduced to a commercially available laser diffraction particle size measuring device (for example, Malvern MS300) to calculate an average particle diameter at a 50% base ($D_{50}$) in the particle size distribution. $D_{10}$ and $D_{90}$ mean particle sizes at 10% and 90%, respectively, in the particle size distribution.

Another embodiment of the present application provides a method for preparing a carbon nanotube dispersion comprising mixing bundle-type carbon nanotubes, a dispersion medium and the polyvinyl butyral resin having a weight average molecular-weight of greater than 50,000.

Another embodiment of the present application provides a method for preparing electrode slurry comprising mixing the carbon nanotube dispersion liquid, an electrode active material and a binder resin.

Another embodiment of the present application provides a method for preparing an electrode comprising preparing electrode slurry by mixing the carbon nanotube dispersion liquid, an electrode active material and a binder resin; and forming an electrode using the electrode slurry.

Another embodiment of the present application provides electrode slurry comprising the carbon nanotube dispersion, an electrode active material and a binder resin.

Another embodiment of the present application provides an electrode prepared using electrode slurry comprising the carbon nanotube dispersion liquid, an electrode active material and a binder resin, and a secondary battery comprising this electrode. The electrode being prepared using electrode slurry means comprising the electrode slurry, dried materials thereof or cured materials thereof.

Advantageous Effects

A carbon nanotube dispersion liquid according to embodiments of the present application is advantageous in mixing carbon nanotubes and a dispersion medium having different polarity by using a polyvinyl butyral resin having, as a polyvinyl butyral resin having a hydroxyl group that is a polar group and a butyral group that is a nonpolar group, a specific molecular weight range together with bundle-type carbon nanotubes. In addition, by using the polyvinyl butyral resin described above, a problem of an electrode having low adhesive strength caused by a conductor being not dispersed can be improved. Accordingly, in the carbon nanotube dispersion according to embodiments of the present specification, carbon nanotubes can be uniformly dispersed into a dispersion medium, and can be dispersed and included in a high concentration without concern over an increase in the dispersion liquid viscosity.

Mode for Disclosure

Hereinafter, the present disclosure will be described in more detail in order to illuminate the present disclosure.

Terms or words used in the present specification and the claims are not to be interpreted limitedly to common or dictionary meanings, and shall be interpreted as meanings and concepts corresponding to technological ideas of the present disclosure based on a principle in which inventors may suitably define the concepts of terms in order to describe their own invention in the best possible way.

A carbon nanotube dispersion liquid according to one embodiment of the present application comprises bundle-type carbon nanotubes, a dispersion medium, and a polyvinyl butyral resin having a weight average molecular weight of greater than 50,000, wherein dispersed particle diameters of the bundle-type carbon nanotubes have particle size distribution $D_{50}$ of 3 μm to 10 μm.

When the polyvinyl butyral resin has a high weight average molecular weight, carbon nanotube dispersibility may be enhanced compared to when using the same amount of a low molecular weight polyvinyl butyral resin.

According to another embodiment of the present application, the polyvinyl butyral resin has a weight average molecular weight of 150,000 or greater.

According to another embodiment of the present application, the polyvinyl butyral resin has a weight average molecular weight of 200,000 or greater.

According to another embodiment of the present application, the polyvinyl butyral resin has a weight average molecular weight of 350,000 or less.

A weight average molecular weight of the polyvinyl butyral resin is measured using gel permeation chromatography (GPC) under the following condition. Mien measuring the molecular weight, DMF is used as a solvent. In a dispersion liquid state, a molecular weight of the supernatant may be measured after centrifuge, and in electrode and battery states, the electrode is scratched, and a polyvinyl butyral resin is extracted using THF to measure the molecular weight.

Column: polar gel M+L
Solvent: DMF including 0.05 M LiBr salt (0.45 μm filtered)
Flow rate: 1.0 ml/min
Injection Volume: 100 μL (0.45 μm filtered)
Measurement time: 30 min
Detector: Waters RI detector According to another embodiment of the present application, a content of a hydroxyl group-containing repeating unit of the polyvinyl butyral resin is 15% by weight or greater.

According to another embodiment of the present application, a content of a hydroxyl group-containing repeating unit of the polyvinyl butyral resin is 20% by weight or greater.

According to another embodiment of the present application, a content of a hydroxyl group-containing repeating unit of the polyvinyl butyral resin is 35% by weight or less.

When the polyvinyl butyral resin has a high hydroxyl group content, mixing energy of the carbon nanotube dispersion liquid increases enhancing stability in a battery state. A content of a hydroxyl group-containing repeating unit of the polyvinyl butyral resin may be measured through NMR. A polyvinyl butyral resin is generally prepared in an aqueous system, and as the hydroxyl group content increases, the polyvinyl butyral resin is dissolved in water blocking a process line. This makes smooth production difficult, and a polyvinyl butyral resin having a high hydroxyl group-containing repeating unit content has been hardly mass-produced. However, the inventors of the present disclosure have found out that having a high hydroxyl group-containing repeating unit content as described above is useful in a carbon nanotube dispersion liquid.

An acetyl group-containing repeating unit content in the polyvinyl butyral resin is 5% by weight or less. An acetyl group may inhibit dispersion liquid due to a viscosity increase when present in a polyvinyl butyral resin, and therefore, it is preferred that the acetyl group-containing repeating unit content be smaller as possible in a content of 5% by weight or less. The acetyl group-containing repeating unit may be measured through NMR.

According to another embodiment of the present application, the carbon nanotube dispersion liquid comprises a first polyvinyl butyral resin having a weight average molecular weight of greater than 50,000; and a second polyvinyl butyral resin having a lower weight average molecular weight than the first polyvinyl butyral resin. When using two or more types of polyvinyl butyral resins having different molecular weights, PDI becomes wider, and for example, may be 3 to 7. Accordingly, enhancement in the adhesive strength by the high molecular weight resin may be accomplished while aiming enhancement in the dispersibility by the low molecular weight resin. PDI may also be measured using gel permeation chromatography (GPC). After obtaining a weight average molecular weight (Mw) and a number average molecular weight (Mn) using the above-mentioned method, molecular weight distribution (PDI) may be calculated from the weight average molecular weight/number average molecular weight (Mw/Mn).

Herein, the second polyvinyl butyral resin may have a weight average molecular weight of greater than 50,000 as long as having a weight average molecular weight lower than the first polyvinyl butyral resin, however, the weight average molecular weight may also be 50,000 or less. Using a polyvinyl butyral resin having a weight average molecular weight of 50,000 or less may enhance carbon nanotube dispersibility by reducing viscosity, and using a polyvinyl butyral resin having a weight average molecular weight of greater than 50,000 may increase material flexibility. Specifically, when examining a carbon nanotube dispersion process, dispersion is progressed with the polyvinyl butyral resin having a lower molecular weight first using a bead mill or a disperser, and therefore, effects of reducing viscosity and enhancing dispersibility of the carbon nanotube dispersion liquid may be obtained by the polyvinyl butyral resin having a lower molecular weight. Then, by mixing the polyvinyl butyral resin having a higher molecular weight thereto using a mixer, battery flexibility may be enhanced by the polyvinyl butyral resin having a higher molecular weight.

According to one embodiment, as the second polyvinyl butyral resin, a polyvinyl butyral resin having a weight average molecular weight of greater than or equal to 1,000 and less than 50,000 may be used. The second resin having a weight average molecular weight of 1,000 or greater may prevent final property decline (flexibility decrease and the like), and the weight average molecular weight being less than 50,000 may enhance dispersibility by preventing a viscosity increase.

According to one embodiment, as the polyvinyl butyral resin, a resin comprising a butyral-containing unit of the following Chemical Formula 1, an acetyl group-containing unit of the following Chemical Formula 2, and a hydroxyl group-containing unit of the following Chemical Formula 3 may be used.

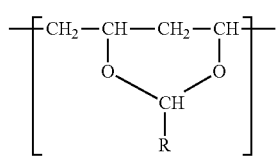

[Chemical Formula 1]

In Chemical Formula 1, R is an alkyl group having 1 to 20 carbon atoms, R may be an alkyl group having 1 to 5 carbon atoms, and specifically may be an alkyl group having 1 to 3 carbon atoms.

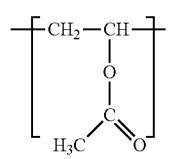

[Chemical Formula 2]

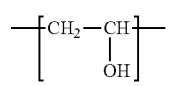

[Chemical Formula 3]

As the polyvinyl butyral resin, various commercial products and synthetic products may be used either alone or in two or more types as long as a content and a weight average molecular weight of the repeating unit described above are satisfied. In addition, those adjusting the hydroxyl group using a chemical modification method such as an acylation reaction or an urethanization reaction may also be used.

According to another embodiment of the present application, the carbon nanotube dispersion liquid comprises a carbon nanotube complex in which the polyvinyl butyral resin is introduced to a surface of entangled-type carbon nanotubes.

According to another embodiment of the present application, dispersed particle diameters of the entangled-type carbon nanotubes have particle size distribution such that $D_{50}$ is from 3 µm to 10 µm, for example, 5 µm to 7 µm, $D_{10}$ is 1 µm or greater, and $D_{90}$ is 30 µm or less, for example, 20 µm or less. For example, the dispersed particle diameters of the carbon nanotubes have particle size distribution $D_{10}$ of 1 µm to 3 µm. According to a specific example, $D_{50}$ of 6 µm and $D_{90}$ of 20 µm may be employed as target values. Herein, the dispersed particle diameters of the carbon nanotubes mean particle diameters of secondary particles formed by first particles of the carbon nanotubes aggregating with each other. Such dispersed particle diameters may be measured using a laser diffraction particle size analysis method.

Meanwhile, according to one embodiment of the present disclosure, the bundle-type carbon nanotubes may be bundle-type carbon nanotubes formed with a carbon nanotube bundle in which carbon nanotube monomers having diameters of 10 nm to 15 nm are aligned in a certain direction. The diameters of the bundle-type carbon nanotubes may be measured through SEM.

In the present disclosure, the bundle-type refers to a secondary form having a bundle or rope shape in which a plurality of carbon nanotubes are arranged or aligned side by side. As a reference, the entangled-type refers to a secondary form having a sphere or potato shape in which a plurality of carbon nanotubes are entangled without directivity.

In the carbon nanotubes mentioned in the present specification, a graphite sheet has a cylinder shape with a nano-sized diameter, and has a $sp^2$ bonding structure. Herein, the carbon nanotubes exhibit properties of a conductor or a semiconductor depending on the rolled angle and structure of the graphite sheet. In addition, the carbon nanotubes may be divided into single-walled carbon nanotubes (SWCNT), double-walled carbon nanotubes (DWCNT) and multi-walled carbon nanotubes (MWCNT) depending on the number of bonds forming the wall, and these carbon nanotubes may be properly selected depending on the application of the dispersion liquid. Specifically, the single-walled carbon nanotubes have metallic properties and semiconductor properties and thereby may exhibit various electric, chemical, physical and optical properties, and therefore, may be suited when using a carbon nanotube dispersion liquid for applications of obtaining minute and integrated devices.

In the carbon nanotube dispersion liquid according to one embodiment of the present disclosure, the carbon nanotubes may comprise any one, two or more of the single-walled, the double-walled and the multi-walled carbon nanotubes.

In addition, the bundle-type carbon nanotubes including the carbon nanotube monomers may have a BET specific surface area of 220 $m^2/g$ to 260 $m^2/g$. Bundle-type carbon nanotubes generally have a larger BET specific surface area compared to entangled-type carbon nanotubes. By having such a BET specific surface area, more superior dispersibility may be obtained when combined with the polyvinyl butyral resin.

In the present disclosure, the specific surface area of the bundle-type carbon nanotubes is measured using a BET method, and specifically, may be calculated from a nitrogen gas adsorption amount under a liquid nitrogen temperature (77K) using BELSORP-mino II manufactured by BEL Japan.

The bundle-type carbon nanotubes may be manufactured using common methods such as an arc discharge method, a laser vaporization method and a chemical vapor deposition method, and those that are commercially available may be purchased to be used.

According to one embodiment, in the dispersion liquid, the bundle-type carbon nanotubes may be included in 1% by weight to 5% by weight based on the whole dispersion liquid (100% by weight), and the polyvinyl butyral resin may be included in 10 parts by weight to 50 parts by weight with respect to 100 parts by weight of the bundle-type carbon nanotubes. When the carbon nanotube content is 1% by weight or greater, slurry solid occupies over a certain level when preparing electrode slurry, which is advantageous for electrode coating. Increasing the carbon nanotube content is advantageous in terms of processability, however, the carbon nanotube content being 5% by weight or less prevents dispersion viscosity from rising too high facilitating the preparation into a disperser.

According to one embodiment of the present application, the dispersion medium may be an organic solvent comprising any one, or two or more heteroatoms selected from the group consisting of a nitrogen atom (N) and an oxygen atom (O) having an unshared electron pair.

Specific examples of the dispersion medium may comprise amide-based polar organic solvents such as dimethylformamide (DMF), diethylformamide, dimethylacetamide (DMAc) or N-methyl pyrrolidone (NMP); alcohols such as methanol, ethanol, 1-propanol, 2-propanol (isopropyl alcohol), 1-butanol (n-butanol), 2-methyl-1-propanol (isobutanol), 2-butanol (sec-butanol), 1-methyl-2-propanol (tert-butanol), pentanol, hexanol, heptanol or octanol; glycols such as ethylene glycol, diethylene glycol, triethylene glycol, propylene glycol, 1,3-propanediol, 1,3-butanediol, 1,5-pentanediol or hexylene glycol; polyalcohols such as glycerin, trimethylolpropane, pentaerythritol or sorbitol; glycol ethers such as ethylene glycol monomethyl ether, diethylene glycol monomethyl ether, triethylene glycol monomethyl ether, tetraethylene glycol monomethyl ether, ethylene glycol monoethyl ether, diethylene glycol monoethyl ether, triethylene glycol monoethyl ether, tetraethylene glycol monoethyl ether, ethylene glycol monobutyl ether, diethylene glycol monobutyl ether, triethylene glycol monobutyl ether or tetraethylene glycol monobutyl ether; ketons such as acetone, methyl ethyl ketone, methyl propyl ketone or cyclopentanone; esters such as ethyl acetate, γ-butyrolactone, or ε-propiolactone, and any one, or a mixture of two or more thereof may be used.

Particularly, N-methyl-2-pyrrolidone is an organic compound having a 5-membered ring structure comprising a lactam structure, and belongs to an aprotic polar solvent such as dimethylformamide, dimethylacetamide and dimethyl sulfoxide. In order to have high solubility, N-methyl-2-pyrrolidone is used as a solvent for various materials particularly comprising a polymer chemistry field. Accordingly, using N-methyl-2-pyrrolidone is preferred.

The content of the bundle-type carbon nanotubes, the dispersion medium and the polyvinyl butyral resin may be properly determined depending on the application of the dispersion liquid.

According to one embodiment, for uniformly dispersing the carbon nanotubes into the dispersion liquid, the polyvinyl butyral resin may be included in 10 parts by weight to 50 parts by weight with respect to 100 parts by weight of the bundle-type carbon nanotubes. When the polyvinyl butyral resin content is less than 10 parts by weight, the carbon nanotubes are difficult to be uniformly dispersed into the dispersion liquid, and the content being greater than 50 parts by weight may cause concern of processability decline and the like due to an increase in the dispersion liquid viscosity.

According to one embodiment, the content of the whole solute comprising the bundle-type carbon nanotubes and the polyvinyl butyral resin is from 1% by weight to 15% by weight, and the content of the dispersion medium may be from 85% by weight to 99% by weight. In addition, the content of the bundle-type carbon nanotubes is from 50% by weight to 90% by weight and the content of the polyvinyl butyral resin may be from 10% by weight to 50% by weight in the whole solute. In the above-mentioned range, the bundle-type carbon nanotubes may be uniformly dispersed into the solvent.

According to another embodiment of the present application, the carbon nanotube dispersion liquid may have viscosity of 1 Pa·s to 100 Pa·s, and for example, 50 Pa·s to 80 Pa·s. Viscosity of the dispersion liquid may be measured using a Haake rheometer, and specifically, the viscosity may be measured at a shear of 1.2/s.

The carbon nanotube dispersion liquid according to the embodiment described above may be prepared using a preparation method comprising mixing bundle-type carbon nanotubes, a dispersion medium and the polyvinyl butyral resin described above. For example, the carbon nanotube dispersion liquid may be prepared by adding bundle-type carbon nanotubes to a dispersion medium in which the polyvinyl butyral resin is dissolved, adding bundle-type carbon nanotubes to a dispersion medium and then dissolving the polyvinyl butyral resin therein, or adding and mixing bundle-type carbon nanotubes and the polyvinyl butyral resin to a dispersion medium.

According to one embodiment, the carbon nanotube dispersion liquid may be prepared using a method comprising preparing carbon nanotube slurry by mixing bundle-type carbon nanotubes and a dispersion medium (Step 1); and mixing the polyvinyl butyral resin to the carbon nanotube slurry (Step 2).

Hereinafter, each step will be described in detail.

Step 1 for preparing the carbon nanotube dispersion liquid is preparing carbon nanotube slurry by mixing bundle-type carbon nanotubes and a dispersion medium. Herein, types and amounts of the bundle-type carbon nanotubes and the dispersion medium used are the same as described above.

The mixing of bundle-type carbon nanotubes and a dispersion medium may be carried out using conation mixing methods, specifically, using a mixing apparatus such as a homogenizer, a beads mill, a ball mill, a basket mill, an attrition mill, an all-round stirrer, a clear mixer or a TK mixer.

In addition, in the mixing of bundle-type carbon nanotubes and a dispersion medium, a cavitation dispersion treatment may be carried out for enhancing miscibility of the bundle-type carbon nanotubes and the dispersion medium, or increasing dispersibility of the carbon nanotubes in the dispersion medium. The cavitation dispersion treatment is a dispersion treatment method using shock waves generated by the rupture of vacuum bubbles produced in water when high energy is applied to a liquid, and the bundle-type carbon nanotubes may be dispersed using the method without damaging their properties. Specifically, the cavitation dispersion treatment may be carried out by an ultrasonic wave, a jet mill or a shear dispersion treatment.

The dispersion treatment process may be properly carried out depending on the amount of the bundle-type carbon nanotubes and the type of the dispersant.

Specifically, when the ultrasonic treatment is carried out, the frequency is in a range of 10 kHz to 150 kHz, the amplitude may be in a range of 5 μm to 100 μm, and the irradiation time may be from 1 minute to 300 minutes. As an ultrasonic wave generator for carrying out the ultrasonic treatment process, an ultrasonic homogenizer and the like may be used for example. In addition, when carrying the jet mill treatment, the pressure may be from 20 MPa to 250 MPa, and the treatment may be carried out once or more, specifically, for a plurality of times of twice or more. In addition, as the jet-mill dispersion apparatus, a high pressure wet jet mill and the like may be used.

The temperature is not particularly limited when carrying out the cavitation dispersion treatment process, however, the treatment may be carried out under a temperature causing no concern of changes in the dispersion liquid viscosity caused by evaporation of the dispersion medium. Specifically, the treatment may be carried out at a temperature of 50° C. or lower and more specifically at a temperature of 15° C. to 50° C.

In addition, Step 2 for preparing the carbon nanotube dispersion liquid according to one embodiment of the present disclosure is mixing the polyvinyl butyral resin to the carbon nanotube slurry prepared in Step 1. Herein, the type and the amount of the polyvinyl butyral resin used are the same as described above.

The mixing process may be carried out using common mixing or dispersion methods, and specifically, may be carried out using a milling method such as a ball mill, a bead mill or a basket mill, or using a homogenizer, a beads mill, a ball mill, a basket mill, an attrition mill, an all-round stirrer, a clear-mixer or a TK mixer. More specifically, a milling method using a bead mill may be used. Herein, the size of the bead mill may be properly determined depending on the type and the amount of the bundle-type carbon nanotubes, and the type of the polyvinyl butyral resin, and specifically, the diameter of the bead mill may be from 0.5 mm to 2 mm.

Using the preparation method as above, the dispersion liquid in which the bundle-type carbon nanotubes are uniformly dispersed into the dispersion medium may be prepared.

Specifically, in the carbon nanotube dispersion liquid according to embodiments of the present disclosure, the polyvinyl butyral resin is introduced to a surface of the carbon nanotubes through physically or chemically binding on the carbon nanotube surface, and the result is dispersed and included in a carbon nanotube-dispersant complex form. Specifically, the dispersed particle diameters of the carbon nanotubes have particle size distribution such that $D_{50}$ is from 3 μm to 10 μm, $D_{10}$ is 1 μm or greater, and $D_{90}$ is 30 μm or less.

Accordingly, the carbon nanotube dispersion liquid according to the present disclosure may exhibit more superior electric, thermal and mechanical properties due to uniform dispersion of the carbon nanotubes, and workability is enhanced as well by maintaining low viscosity, and as a result, application and commercialization in various fields may be accomplished.

Another embodiment of the present application provides a method for preparing electrode slurry comprising mixing the carbon nanotube dispersion liquid, an electrode active material and a binder resin.

Another embodiment of the present application provides a method for preparing an electrode comprising preparing electrode slurry by mixing the carbon nanotube dispersion liquid, an electrode active material and a binder resin; and forming an electrode using the electrode slurry.

As the electrode slurry and electrode preparation methods and materials such as an electrode active material and a binder resin, those known in the art may be used. For example, PVDF and the like may be used as the binder resin. While the binder resin such as PVDF in the electrode slurry is used for adhering a metal thin film and an electrode active material, the polyvinyl butyral resin in the carbon nanotube dispersion liquid described above is for dispersing the carbon nanotubes before being mixed with the electrode active material. The binder resin in the electrode slurry to which an electrode active material is already added may not perform a role of dispersing the carbon nanotubes, and therefore, the binder resin in the electrode slurry and the partially hydrogenated nitrile resin in the carbon nanotube dispersion liquid are distinguished.

The forming of an electrode may be carried out by coating the slurry on a current collector, and drying or curing the result as necessary.

Another embodiment of the present application provides electrode slurry comprising the carbon nanotube dispersion partially hydrogenated nitrile rubber, an electrode active material and a binder resin.

Another embodiment of the present application provides an electrode prepared using electrode slurry comprising the carbon nanotube dispersion liquid, an electrode active material and a binder resin, and a secondary battery comprising this electrode. The electrode being prepared using electrode slurry means including the electrode slurry, dried materials thereof or cured materials thereof.

The secondary battery comprises a positive electrode, a negative electrode and an electrolyte, and at least one of the positive electrode and the negative electrode may be prepared using electrode slurry comprising the carbon nanotube dispersion liquid. The battery may further include a separator provided between the positive electrode and the negative electrode as necessary.

The secondary battery may be a lithium ion secondary battery.

Hereinafter, examples of the present disclosure will be described in detail so that those having common knowledge in the technology field to which the present disclosure belongs may readily implement the present disclosure. However, the present disclosure may be embodied in various different forms and is not limited to the examples described herein.

EXAMPLES 1 TO 6 AND COMPARATIVE EXAMPLES 1 to 7

To an N-methyl pyrrolidone (NMP) solvent, bundle-type carbon nanotubes having a monomer diameter of 10 nm to 15 nm and BET of 240 $m^2$/g to 250 $m^2$/g, and a polyvinyl butyral resin of the following Table 1 were mixed in a content as shown in the following Table 2 to prepare a carbon nanotube dispersion liquid. % by weight in Table 1 is based on 100% by weight of the polyvinyl butyral resin, and % by weight in Table 2 is based on 100% by weight of the carbon nanotube dispersion liquid. Herein, a beads mill was used. Dispersed particle diameters and viscosity of the prepared dispersion liquid were measured and are shown in the following Table 3.

In order to prepare electrode slurry (100 parts by weight of solid), the carbon nanotube dispersion liquid prepared above was mixed with 97.8 parts by weight of a ternary positive electrode active material and 1 parts by weight of a PVdF-based binder. Herein, the carbon nanotubes and the polyvinyl butyral resin were present in 1 parts by weight and 0.2 parts by weight, respectively. Subsequently, the electrode slurry was coated on an aluminum current collector, and the result was rolled using a roll press to prepare a positive electrode polar plate (mix density 3.3 g/cc).

Meanwhile, negative electrode slurry comprising 97.3 parts by weight of a negative electrode active material, 0.7 parts by weight of a conductor, 1 parts by weight of a viscosity agent (CMC) and 1 parts by weight of a binder (SBR) was coated on a copper current collector, and the result was rolled to prepare a negative electrode polar plate having mix density of 1.6 g/cc.

A monocell was manufactured using the positive electrode applying the dispersion liquid prepared above and the negative electrode. Specifically, a polyethylene separator was placed between the negative electrode polar plate and the positive electrode polar plate, the result was introduced to a battery case, and then a liquid, electrolyte was injected thereto to manufacture a battery. Herein, as the liquid electrolyte, a 1.0 M $LiPF_6$-dissolved mixed solution of ethylene carbonate, ethylmethyl carbonate and diethyl carbonate (1/2/1 volume ratio) was used.

Adhesive Strength Measurement

In order to measure adhesive strength, the positive electrode polar plate (prior to manufacturing a battery) prepared as above was cut to pieces having a same size of 15 mm×150 mm, the pieces were fixed on slide glass, and peeled off from a current collector to measure 180 degree peel strength. As for the evaluation, peel strength of 5 or more was measured, and the average value was determined. Results of measuring adhesive strength are shown in the following Table 3.

Monocell Evaluation

The battery manufactured above went through 1.0 C/1.0 C charge and discharge 3 times at room temperature, and SOC was established based on the last discharge capacity. 10 second resistance was measured by applying discharge pulse with 6.5 C at SOC 50.

TABLE 1

| | Polyvinyl Butyral Resin (wt %) | | | Molecular Weight (DMF) | |
|---|---|---|---|---|---|
| | PVB (Chemical Formula 1) | PVAc (Chemical Formula 2) | PVA (Chemical Formula 3) | MW (×1,000 g/mol) | PDI |
| Example 1 | 68.3 | 0.9 | 30.8 | 270 | 3.8 |
| Example 2 | 75.0 | 1.2 | 23.8 | 350 | 3.2 |
| Example 3 | 74.1 | 2.3 | 23.6 | 160 | 3.6 |
| Example 4* | 73.5 | 1.8 | 24.7 | 190 | 6.3 |
| Example 4(1)* | 75.0 | 1.2 | 23.8 | 350 | 3.2 |
| Example 4(2)* | 72 | 2.5 | 25.5 | 57 | 2.7 |
| Example 5** | 74.6 | 1.8 | 23.7 | 250 | 4.4 |
| Example 5(1)** | 75.0 | 1.2 | 23.8 | 350 | 3.2 |
| Example 5(2)** | 74.1 | 2.3 | 23.6 | 160 | 3.6 |
| Example 6 | 82.6 | 2.4 | 14.9 | 180 | 3.4 |
| Comparative Example 1 | Not Used | | | | |
| Comparative Example 2 | Commercial Dispersant AFCONA 4570 | | | | |
| Comparative Example 3 | Commercial Dispersant PVP | | | | |
| Comparative Example 4 | 78.0 | 2.5 | 19.5 | 37 | 2.7 |
| Comparative Example 5 | 68.3 | 0.9 | 30.8 | 270 | 3.8 |
| Comparative Example 6 | 68.3 | 0.9 | 30.8 | 270 | 3.8 |
| Comparative Example 7 | 68.3 | 0.9 | 30.8 | 270 | 3.8 |

*The constitution unit content and molecular weight of Example 4 are values based on the whole carbon nanotube dispersion liquid when using both the polyvinyl butyral resin of Example 4(1) and the polyvinyl butyral resin of Example 4(2).
**The constitution unit content and molecular weight of Example 5 are values based on the whole carbon nanotube dispersion liquid when using both the polyvinyl butyral resin of Example 5(1) and the polyvinyl butyral resin of Example 5(2).

TABLE 2

| | Dispersion Composition (wt %) | | | |
|---|---|---|---|---|
| | CNT Type | CNT | Polyvinyl Butyral Resin | Dispersion Medium (NMP) |
| Example 1 | Bundle-type | 2 | 0.4 | 97.6 |
| Example 2 | Bundle-type | 2 | 0.4 | 97.6 |
| Example 3 | Bundle-type | 2 | 0.4 | 97.6 |
| Example 4 | Bundle-type | 2 | 0.4 | 97.6 |
| Example 5 | Bundle-type | 2 | 0.4 | 97.6 |
| Example 6 | Bundle-type | 2 | 0.4 | 97.6 |
| Comparative Example 1 | Bundle-type | 2 | 0 | 98 |
| Comparative Example 2 | Bundle-type | 2 | 0.4 | 97.6 |
| Comparative Example 3 | Bundle-type | 2 | 0.4 | 97.6 |
| Comparative Example 4 | Bundle-type | 2 | 0.4 | 97.6 |
| Comparative Example 5 | Entangled-type | 2 | 0.4 | 97.6 |
| Comparative Example 6 | Bundle-type | 2 | 0.4 | 97.6 |
| Comparative Example 7 | Bundle-type | 2 | 0.4 | 97.6 |

TABLE 3

| | Dispersion Property | | | | | Battery Performance (DC-IR (ohm)) 6.5 C, 25° C. Discharge |
|---|---|---|---|---|---|---|
| | Dispersed Particle Diameter (μm) | | | Viscosity (@1.2/s) | Electrode Adhesive Strength | |
| | $D_{10}$ | $D_{50}$ | $D_{90}$ | Pa·s | gf/cm | SOC 50 |
| Example 1 | 1.88 | 5.60 | 14.20 | 65.0 | 32 | 1.269 |
| Example 2 | 2.10 | 5.89 | 15.80 | 61.0 | 36 | 1.283 |
| Example 3 | 2.47 | 6.75 | 19.60 | 57.0 | 28 | 1.277 |
| Example 4 | 2.37 | 6.66 | 18.00 | 54.0 | 25 | 1.271 |
| Example 5 | 2.02 | 5.82 | 19.30 | 60.0 | 29 | 1.264 |
| Example 6 | 2.58 | 6.47 | 19.60 | 72.0 | 15 | 1.632 |
| Comparative Example 1 | Unable to Secure CNT Wetting (Dispersion liquid was not prepared) | | | | | |
| Comparative Example 2 | Unable to Secure CNT Wetting (Dispersion liquid was not prepared) | | | | | |
| Comparative Example 3 | 8.11 | 22.20 | 51.90 | 120.0 | Unable to Prepare Electrode | |
| Comparative Example 4 | 1.42 | 11.10 | 27.30 | 55.0 | 8 | Unable to Manufacture Cell Due to Adhesive Strength Problem |
| Comparative Example 5 | 2.30 | 7.06 | 14.60 | 4.0 | 11 | Unable to Manufacture Cell Due to Adhesive Strength Problem |
| Comparative Example 6 | 4.89 | 14.20 | 37.80 | 110.0 | Electrode Coating Defects Occurred | |
| Comparative Example 7 | 1.13 | 2.45 | 5.21 | 75.0 | 10 | Unable to Manufacture Cell Due to Adhesive Strength Problem |

Hereinbefore, preferred examples of the present disclosure have been described, however, the scope of a right of the present disclosure is not limited thereto, and various modified and improved forms made by those skilled in the art using the basic concept of the present disclosure defined in the attached claims also belong to the scope of a right of the present disclosure.

The invention claimed is:

1. A carbon nanotube dispersion liquid comprising:
   bundle-type carbon nanotubes;
   a dispersion medium; and
   a polyvinyl butyral resin having a weight average molecular weight of greater than 50,000,
   wherein dispersed particle diameters of the bundle-type carbon nanotubes have particle size distributions $D_{50}$ of 3 μm to 10 μm, $D_{10}$ is 1 μm or greater, and $D_{90}$ is 30 μm or less.

2. The carbon nanotube dispersion liquid of claim 1, wherein the polyvinyl butyral resin has a weight average molecular weight of 150,000 or greater.

3. The carbon nanotube dispersion liquid of claim 1, wherein the polyvinyl butyral resin has a weight average molecular weight of 200,000 or greater.

4. The carbon nanotube dispersion liquid of claim 1, wherein a content of a hydroxyl group-containing repeating unit of the polyvinyl butyral resin is 15% by weight or greater.

5. The carbon nanotube dispersion liquid of claim 1, wherein a content of a hydroxyl group-containing repeating unit of the polyvinyl butyral resin is 20% by weight or greater.

6. The carbon nanotube dispersion liquid of claim 1, wherein the polyvinyl butyral resin comprises a first polyvinyl butyral resin having a weight average molecular weight of greater than 50,000; and a second polyvinyl butyral resin having a lower weight average molecular weight than the first polyvinyl butyral resin.

7. A method for preparing the carbon nanotube dispersion liquid of claim 1 comprising mixing bundle-type carbon nanotubes, and a polyvinyl butyral resin having a weight average molecular weight of greater than 50,000.

8. A method for preparing electrode slurry comprising mixing the carbon nanotube dispersion liquid of claim 1, an electrode active material and a binder resin.

9. A method for preparing an electrode comprising:
   preparing electrode slurry by mixing the carbon nanotube dispersion liquid of claim 1, an electrode active material and a binder resin; and
   forming an electrode using the electrode slurry.

10. Electrode slurry comprising:
    the carbon nanotube dispersion liquid of claim 1;
    an electrode active material; and
    a binder resin.

11. An electrode prepared using electrode slurry comprising the carbon nanotube dispersion liquid of claim 1, an electrode active material and a binder resin.

12. A secondary battery comprising the electrode of claim 11.

* * * * *